May 9, 1933.  H. G. GROS  1,908,144
CONTROL APPARATUS FOR VARIABLE SPEED GEARS
Filed March 26, 1931  5 Sheets-Sheet 1

INVENTOR
HENRY G. GROS
BY
ATTORNEYS

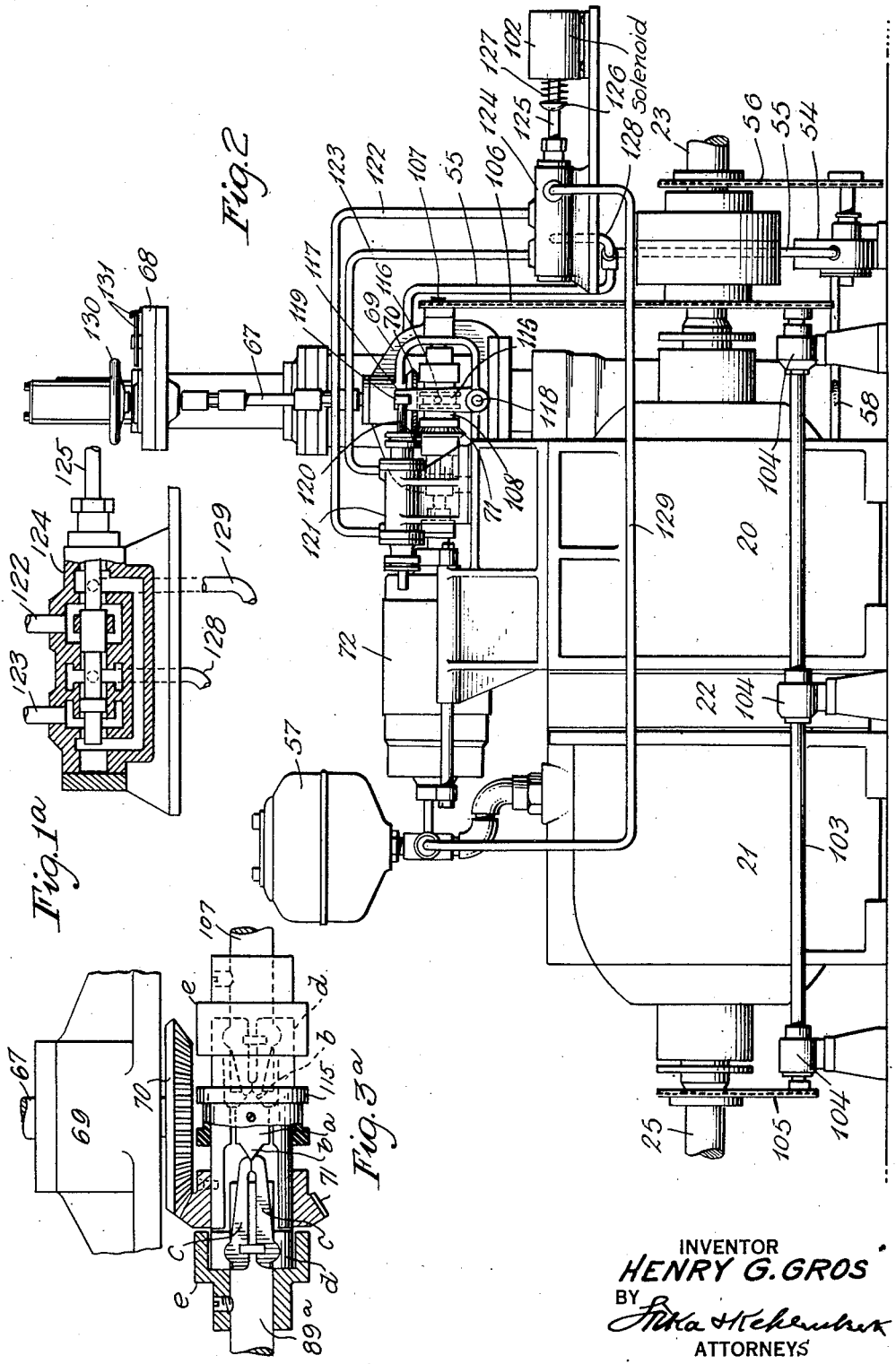

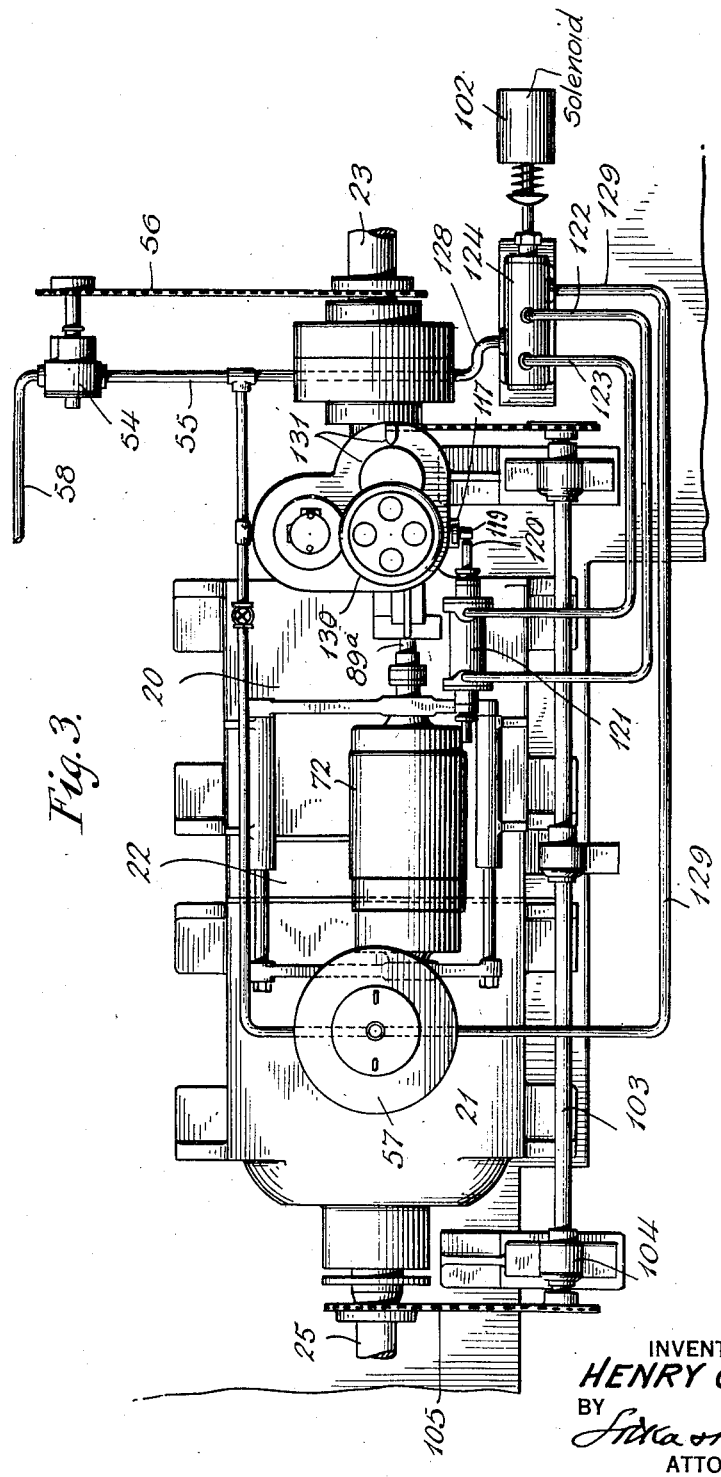

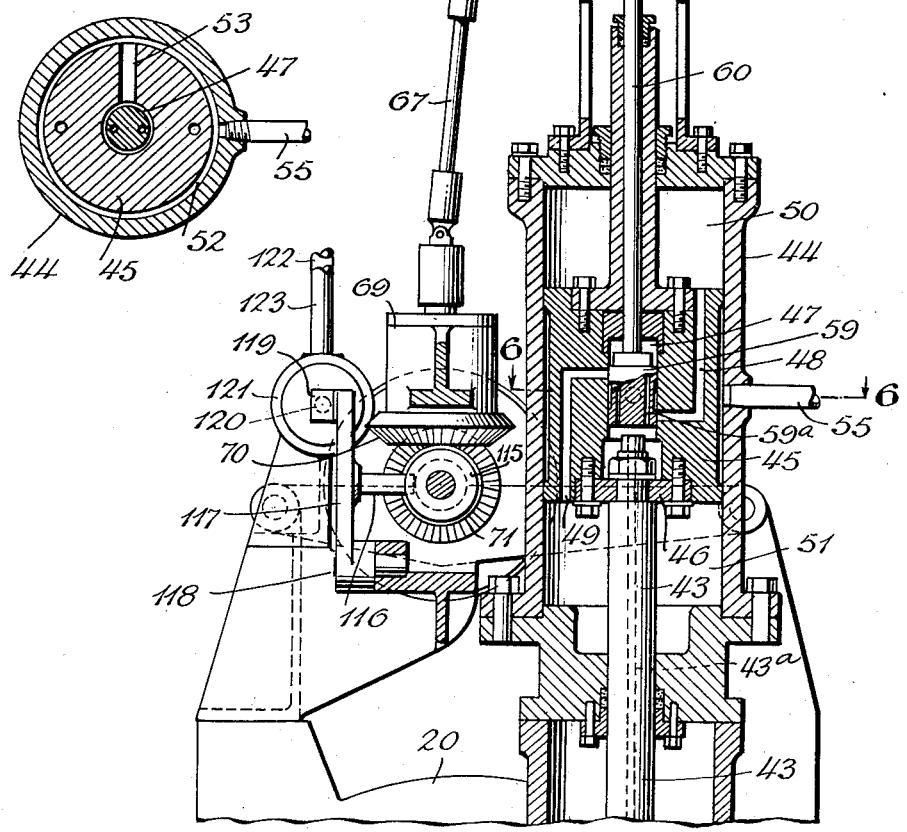

May 9, 1933. H. G. GROS 1,908,144
CONTROL APPARATUS FOR VARIABLE SPEED GEARS
Filed March 26, 1931   5 Sheets-Sheet 5

INVENTOR
HENRY G. GROS
BY
ATTORNEYS

Patented May 9, 1933

1,908,144

UNITED STATES PATENT OFFICE

HENRY G. GROS, OF OAKVILLE, CONNECTICUT, ASSIGNOR TO THE WATERBURY TOOL COMPANY, OF WATERBURY, CONNECTICUT, A CORPORATION OF CONNECTICUT

CONTROL APPARATUS FOR VARIABLE SPEED GEARS

Application filed March 26, 1931. Serial No. 525,364.

The invention relates to variable speed gears and more particularly to that class thereof commonly known as hydraulic speed gears as exemplified by the well known Waterbury type of such gears. The latter generally comprise a hydraulic pump unit and in many forms include a hydraulic motor unit which is controlled and driven by the hydraulic pump unit and in turn actuates and governs the driven apparatus. In any case the hydraulic pump unit includes a swash plate or its equivalent capable of being adjusted to vary the speed of the pump unit and to correspondingly alter the speed of the aforesaid motor unit.

The object of the invention is to provide a simple and efficient control apparatus whereby the control will be effected in a reliable and accurate manner, and whereby the motor unit or the driven mechanism may be held positively stationary regardless of existing or developed load conditions in the driven motor unit or its equivalent. The invention further contemplates the provision of a secondary or intermittent follow-up control means adapted to function in predetermined co-operation with the control apparatus to effect the desired results. Other more specific objects will appear from the description hereinafter, and the features of novelty will be pointed out in the claims.

Figure 1:
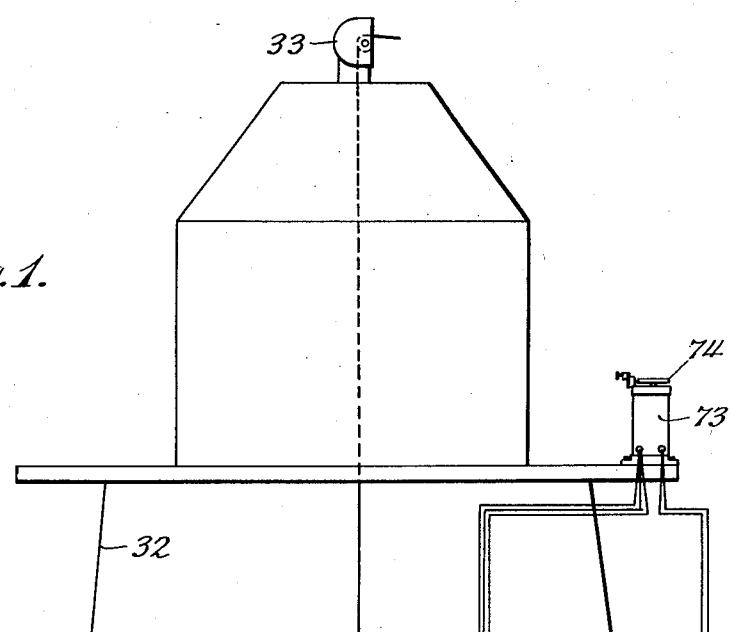
Figure 4:
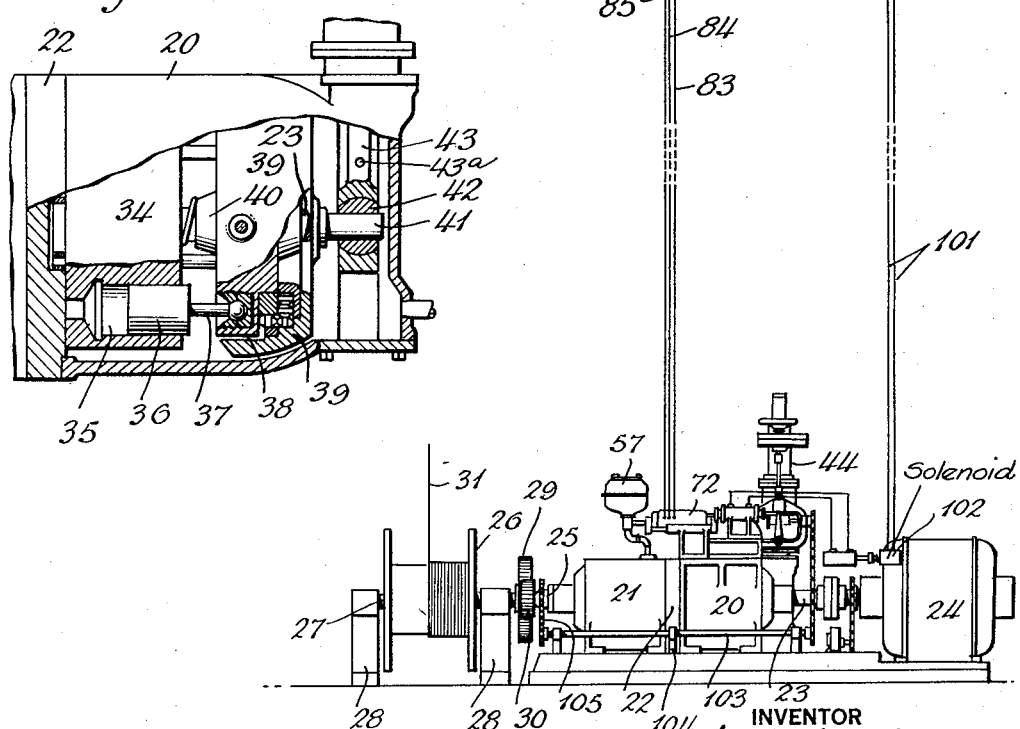
Figure 7:
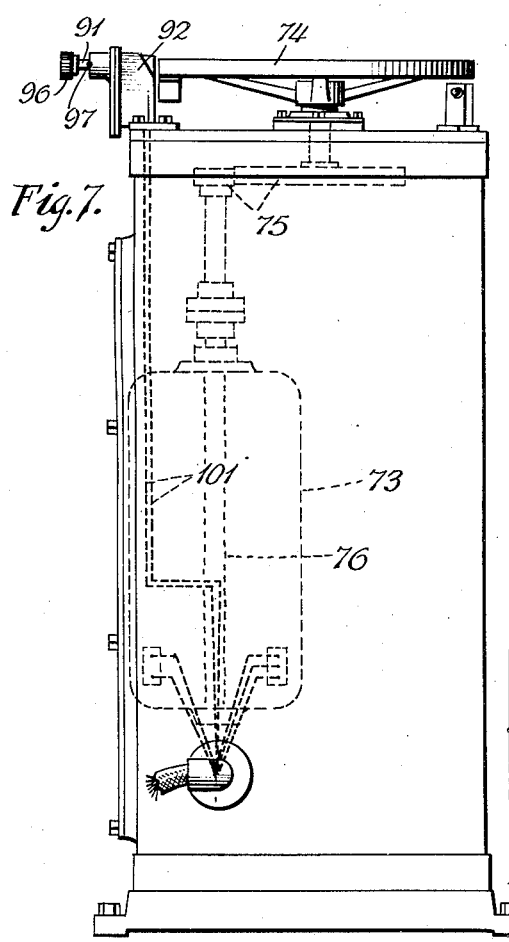
Figure 8:
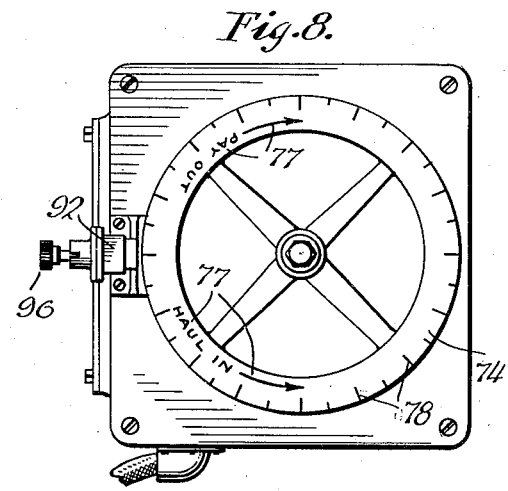
Figure 9:
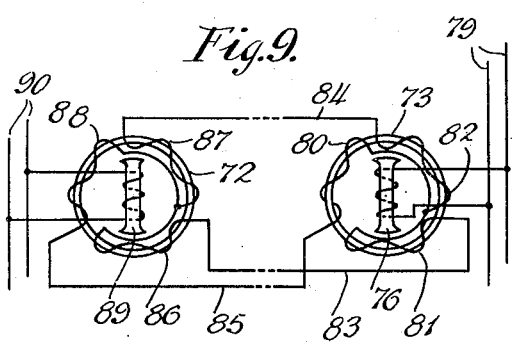
Figure 10:
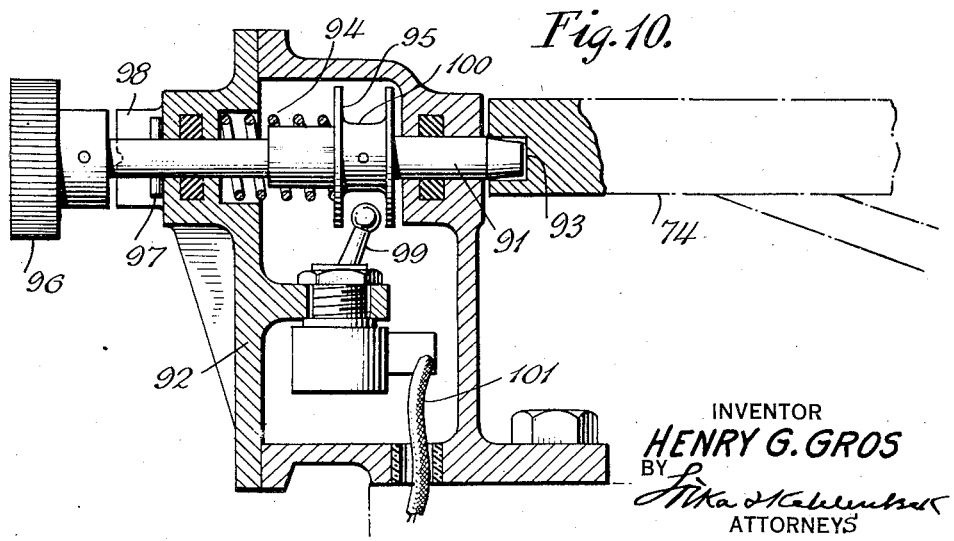

In the accompanying drawings, which illustrate an example of the invention without defining its limits, Fig. 1 is a diagrammatic elevation of the novel apparatus and its associated elements combined with a hydraulic variable speed gear of the Waterbury type adapted to a mooring mast for dirigible airships; Fig. 1ª is a view, partly in section, of the control valve for the clutch; Fig. 2 is a side elevation of the control apparatus and the hydraulic variable speed gear; Fig. 3 is a plan view thereof; Fig. 3ª is a view, partly in section, showing an example of a double clutch included in Figs. 2 and 3; Fig. 4 is a fragmentary elevation, partly in section, of the pump unit of the illustrated hydraulic variable speed gear; Fig. 5 is a fragmentary sectional elevation, on an enlarged scale, of a servo-motor included in the hydraulic variable speed gear; Fig. 6 is a detail sectional view on the line 6—6 of Fig. 5; Fig. 7 is a detail elevation of a Selsyn motor which may be used in connection with the novel control apparatus; Fig. 8 is a plan view of the Selsyn motor; Fig. 9 is a circuit diagram of the Selsyn motor, and Fig. 10 is an enlarged fragmentary section of a portion of said motor.

For purposes of illustration and description the novel control apparatus has been shown in connection with a hydraulic variable speed gear adapted to operate the cable winch of a mooring mast for airships, the manual control and operation of the speed gear being effected through the medium of a Selsyn motor located at the top of the mast. It will be understood that the cable winch of the mooring mast merely exemplifies the mechanism to be driven by the speed gear and that the illustrated example is not intended to define the limits of the invention. Similarly the manual control by means of a Selsyn motor is intended only as an example and may be replaced by other arrangements. In addition, it is to be understood that other types of variable speed gears may be substituted for that of the illustrated example without departing from the spirit of the invention.

As previously stated, the illustrated example shows a hydraulic variable speed gear of the well known Waterbury type which includes a pump unit or section 20 commonly referred to as the A-end, and a motor unit or section 21 generally designated as the B-end. In the form shown the pump section 20 and motor section 21 are combined with each other and are separated by a valve plate section 22. As shown in Figure 1 the driving shaft 23 of the pump section 20 is suitably connected with the armature shaft of an electric motor 24 or other equivalent source of power, while the driving shaft 25 of the motor section 21 is connected with the mechanism or apparatus which is to be driven. The latter is exemplified by the cable winch 26 mounted by means of a shaft 27 in suitable bearings 28, and operatively connected with the speed gear by means of a gear 29 and pinion 30 fixed respectively upon the shafts 27 and 25. The customary cable 31 is trained about the winch 26 and suitable idlers in the conventional manner and extends upwardly through the mast 32 to the mooring head 33; the latter is swivelled upon the mast 32 in accordance with usual and well known arrangements.

The constructional details of the hydraulic speed gear form no part of the present invention, but for completeness of disclosure the construction of the A-end or pump section 20 has been shown in Fig. 4 of the drawing; as both the pump section and motor section are similar in construction, in the illustrated form of speed gear, a description of one will suffice for the other, those differences which exist being clearly pointed out hereinafter. As shown in Fig. 4 a cylinder barrel 34 is fixed upon the driving shaft 23 to rotate therewith and is provided with a plurality of cylinders 35 in which pistons 36 are slidably mounted, said pistons 36 being connected, by means of connecting rods 37 with a swash plate 38 rotatably mounted in a tilting box 39. The swash plate 38 in both the pump section 20 and motor section 21 is connected in driving relationship with the driving shaft of the respective sections, and, in the pump section 20, is capable of angular adjustment relatively to the shaft 23 by means of a suitable universal joint 40. In the motor section 21 it is the usual practice to hold the swash plate at a fixed inclination relatively to its driving shaft; otherwise, as so far described, the construction and arrangement of the sections 20 and 21 may be the same.

For the purpose of adjusting the angle of inclination of a swash plate 38 of the pump section 20 relatively to the driving shaft 23 to thereby vary the speed of the hydraulic speed gear, the co-operating tilting box 39 is provided with a stub shaft 41 which projects into a rocking bearing 42 mounted for oscillation in the lower end of a control rod 43. When the said swash plate 38 and its tilting box 39 are perpendicular to the driving shaft 23, as illustrated in Fig. 4, the pistons 36 of the pump section 20 will have no stroke and no fluid will be delivered by the latter; this is termed the "neutral" position. When, however, said tilting box and swash plate are inclined at an angle to said shaft 23, fluid will be delivered by the pump section 20 in accordance with the direction and extent of such angularity; the greater the angle of adjustment of the swash plate relatively to the driving shaft the greater the stroke of the pistons and therefore the greater the output of the pump section. It will be understood that in accordance with the well known construction of these hydraulic gear devices the valve plate 22 is provided with a pair of suitable arcuate valve ports with which the inner ends of the cylinders 35 communicate in sequence, as the cylinder barrel 34 is rotated, thereby permitting the fluid pumped by the pump section 20 to be delivered to the motor section 21 or its equivalent to actuate the same in the conventional manner.

As shown in the illustrated example adjustment of the control rod 43 is effected preferably by means of a servo-motor 44, the operation of which is controlled in a manner to be more fully set forth hereinafter. In the arrangement illustrated in the drawings the servo-motor 44 is mounted upon the casing of the pump section 20 and includes a piston 45 with which the control rod 43 is connected, for instance, by means of a plate 46 bolted in place, as shown in Fig. 5; the plate 46 also serves to close the lower end of a pilot valve chamber 47 formed in said piston 45. As illustrated in Fig. 5, the piston 45 is provided with a pair of conduits 48, 49, of which the conduit 48 communicates with the chamber 50 formed above the piston 45 in the casing of the servo-motor 44, while the conduit 49 communicates with the chamber 51 formed in said casing below said piston 45. The conduit 48 has a lateral branch which leads to the valve chamber 47 towards the lower end thereof, and the conduit 49 has a similar branch leading to said valve chamber 47 towards the upper end thereof. The outer circumference of the piston 45 is reduced between its ends to form an annular channel 52 which communicates through a radial conduit 53 with the aforesaid valve chamber 47 approximately at the middle point thereof.

Fluid under pressure for operating the servo-motor 44 is supplied by a low pressure pump 54 through a pipe 55 communicating with the annular channel 52 as illustrated in Figs. 5 and 6. The pump 54, as shown in Fig. 2, is preferably driven from the driving shaft 23 of the pump section 20, for instance, by means of a sprocket chain drive or the like 56. The pump 54 may receive its fluid from any suitable source of supply as for instance, the expansion tank 57 of the speed gear through a suction conduit 58.

In order to effect the operation of the servo-motor 44 in a manner to control the speed gear, a pilot valve 59 is mounted for reciprocation in the valve chamber 47 and is reduced between its ends to form a restricted annular passageway for the purpose to be more fully described hereinafter. The pilot valve 59 is furthermore provided with longitudinally extending conduits 59a and is fixed to the lower end of a valve rod 60 terminating at its upper end in a screwthreaded portion 61 and carrying a key 62 which projects into a groove 63 formed in and extending lengthwise of a cap or housing 64 suitably secured to the top of the servo-motor 44, as shown in Fig. 5; the key 62 in co-operation with the groove 63 serves to prevent rotation of the valve rod 60 and its threaded portion 61 for the purpose presently to be set forth. The threaded portion 61 of the valve rod 60 is in screwthreaded engagement with the internally threaded boss of a spur gear 65 rotatably mounted in the housing 64 but fixed against movement in axial directions relatively to said portion 61. The spur gear 65 is arranged in mesh with a second spur gear 66 carried by a vertical shaft 67, which, as shown, may be of the flexible type, and is journalled in a bracket 68 projecting from the housing 64 and a bracket 69 suitably supported upon the servo-motor 44 or other portion of the mechanism; the shaft 67 is adapted to be operatively connected with the means whereby the control of the speed gear is effected.

The control means, in the present instance, comprises two mechanisms, one of which may be termed the major control and the other the secondary or intermittent follow-up control; the major control may be and preferably is of such type as to enable it to function from a remote point relatively to the speed gear. The shaft 67 is accordingly provided, at its lower end, with a bevel gear 70 which meshes with a co-operating bevel gear 71, which gears serve to operatively connect one or the other of the aforesaid control means with the servo-motor 44. The major and preferably remote controlling means consists of a Selsyn receiver or motor 72 and a Selsyn transmitter 73; the latter in the illustrated example being located upon a suitable platform at the top of the mooring mast 32, as shown in Fig. 1. The transmitter 73 of the synchronous electric or Selsyn system is provided with a hand wheel 74 connected by means of gears 75 with the rotor 76 of said transmitter 73, and preferably provided upon its exposed face with legends and indications 77 indicating, for instance, direction of operation of the speed gear and a scale 78 designating, for instance, different degrees of operation.

Although the constructional details of the Selsyn units form no part of the present invention, it has been deemed desirable, for completeness of disclosure, to illustrate diagrammatically in Fig. 9 the wiring and circuits by which such units are connected. It will be understood that the Selsyn units of the illustrated example are intended to exemplify any suitable synchronous electrical transmitting system, and that the instant construction is accordingly not limited to such Selsyn units. A Selsyn system consists fundamentally of a transmitter and a receiver which are in some respects similar to 3-phase induction motors interconnected and arranged to operate in such a manner that one unit reproduces any motion imparted to the other. As indicated in Fig. 9 the rotor 76 of the transmitter 73 is a shuttle wound rotor with definite pulls, the windings of which are connected to a single phase alternating current source of electricity, the lead wires being indicated by the reference character 79. The windings of the stator of the transmitter 73 are indicated as 80, 81, 82 and these windings are interconnected by means of wires 83, 84, 85 with the corresponding stator windings 86, 87, 88 of the receiver 72, the rotor 89 of which is also excited from the same source of electricity as is the rotor 76; the lead wires for the rotor 89 are indicated by the reference character 90. The rotor 89 of the receiver 72 is arranged to operate the shaft 89a of said receiver, said shaft 89a being suitably journalled in the bracket 69.

For the purpose of locking the hand wheel 74 in its normal position, a locking member 91 is slidably mounted in a box 92 suitably secured upon the transmitter 73, and is adapted to co-operate with and project into a recess 93 located at the proper point on the periphery of the hand wheel 74. The locking member 91 is normally maintained in and returned to its locking position by a spring 94, one end of which bears against a portion of the box 92 and the other end of which engages a projection 95 fixed on the locking member 91 as shown in Fig. 10. The locking member 91 is provided with a head 96 or its equivalent to facilitate the manipulation of said member 91, and further includes a pin or stud 97 adapted to co-operate with recessed lugs 98 on the box 92 to maintain said locking member 91 at will in its retracted, inoperative position against the tension of the spring 94.

In the illustrated example the actuation of the locking member 91 coincidentally operates an electric switch 99, the previously mentioned projection 95 being accordingly provided with a groove 100 into which said switch 99 projects. The switch 99 is included in and controls an electric circuit 101 in which a solenoid 102 is also located and thus serves to control the energizing and de-energizing of said solenoid 102 for the purpose which will appear more fully hereinafter.

The secondary or intermittent follow-up control consists of a horizontal shaft 103 journalled in suitable bearings 104, preferably of the anti-friction type, said shaft 103 being operatively connected with the driving shaft 25 of the motor section 21 of the speed gear, for instance, by means of a sprocket chain drive 105 or its equivalent. The shaft 103 is further operatively connected, for instance, by means of a second sprocket chain drive 106 with a shaft 107 journalled in the bracket 69 in axial registry with the shaft 89a of the Selsyn receiver 72.

For the purpose of independently connecting the major control and the secondary or intermittent follow-up control with the servo-motor 44, a double clutch of suitable and conventional type is provided, said clutch being constructed in any well known way to provide for the connection of the shaft 67 of the servo-motor 44 with the major control and the secondary or intermittent follow-up control in inverse relation and to correspondingly effect disconnection thereof. While the specific construction of the double clutch forms no part of the present invention, it has been deemed advisable to illustrate in detail a satisfactory form of such clutch in Fig. 3ª; it is to be distinctly understood, however, that this is only an example and that the illustrated clutch may be replaced by other suitable types. In the illustrated example the aforesaid double clutch 108 includes a slidable collar 115 for effecting the engagement and disengagement of the respective clutch members of the double clutch 108 in operative sequence; for this purpose the collar 115 is connected with a slidable block a provided with oppositely extending projections b of tapering form. As the collar 115 is slidably shifted the tapering projections b act upon levers c to spread the same and to correspondingly spread the clutch members d with which said levers c are connected; the clutch members d comprise split rings adapted to frictionally engage the inner surfaces of coupling members e secured upon the respective shafts 89a and 107. The block a is slidably mounted in a sleeve f which carries the bevel gear 71 and on which said collar 115 is slidable. The latter, as shown in Fig. 2, is annularly grooved to accommodate a pin 116 which projects from a lever 117 pivoted at 118 upon the bracket 69 and carrying a lug 119 connected with a piston rod 120 adapted to be slidably reciprocated by the piston of an operating cylinder 121 suitably supported upon the speed gear, as illustrated in Fig. 2. The opposite ends of the cylinder 121 are connected by pipes 122 and 123 with the casing of a four-way control valve 124, suitably mounted with its stem 125 in operative relation and axial registry with the armature 126 of the solenoid 102; the armature 126 is influenced by a spring 127 as indicated in Fig. 2. The four-way control valve 124 is connected with the pump 54 by means of a branch pipe 128 which leads to the pump connection 55, and further is shown in communication with the expansion tank 57 of the speed gear through the medium of a pipe 129 as shown in Fig. 2.

To enable the servo-motor 44 to be manually adjusted independently of the automatic controls, a hand wheel 130 may be mounted upon the shaft 67, while if desired, a suitable indicating means 131 may be provided to visibly indicate the operation of the servo-motor 44.

For purposes of description it is assumed that the novel control apparatus comprises part of the equipment of a mooring mast for mooring airships, as illustrated in the example shown in the drawings, and that the electric motor 24 is rotating at a uniform speed. Under such conditions, the speed changes of the winch 26 and cable 31 necessary during the mooring of the airship are obtained by properly actuating the hand-wheel 74 of the Selsyn transmitter 73.

As the hand wheel 74 is rotated, in one direction or the other as may be required to meet the existing conditions, the gears 75 will correspondingly rotate the rotor 76 of the transmitter 73 and accordingly will bring about an actuation of the rotor 89 of the receiver or Selsyn motor 72 in the same direction and at the same speed. The rotation of the rotor 89 will be transmitted by the shaft 89a by means of the coupling member e and clutch member d at the left in Fig. 3ª, which are in engagement with each other at this stage, to the bevel gear 71 and by the latter to the co-operating bevel gear 70. As a result, the shaft 67 and gear 66 will be correspondingly rotated whereby the gear 65 will be caused to rotate in its bearings relatively to the valve rod 60; because of the screwthreaded engagement existing between the boss of the gear 65 and the threaded section 61, the rod 60, which is held against rotation by the key 62 and groove 63, will be raised or lowered in accordance with the direction and extent of rotation of said gear 65 and will shift the pilot valve 59 in the valve chamber 47 to the same extent and in the same direction.

If, for example, the gear 65 is rotated in a direction such as to lower the valve rod 60 and pilot valve 59 from the position shown in Fig. 5 of the drawings, the oil or other fluid delivered by the low pressure pump 54 through the pipe 55, will pass into the annular channel 52 from which it will flow through the radial conduit 53 illustrated in Fig. 6 to the annular space between the reduced middle portion of the pilot valve 59 and the wall of the valve chamber 47. As the valve 59 has been assumed to have been moved downwardly from the position shown in Fig. 5, the oil or its equivalent will flow from the valve chamber 47 through the conduit 48 to the chamber 50 above the piston 45. The pressure of said oil accordingly will be exerted upon the upper end of said piston 45 and cause the latter to be moved downwardly to correspondingly move the control rod 43 and to thereby tilt the upper portion of the tilting box 39 and swash plate 38 toward the right in Fig. 4. With this adjustment of the parts, fluid will be pumped by the pistons 36 of the pump section or A-end 20 through the valve plate 22 to the motor section or B-end 21 and accordingly will actuate the pistons thereof and bring about a rotation of the shaft 25; this operation of the latter will be transmitted through the gears 30 and 29 to the winch 26 and cause it to be rotated to either wind up or unwind the cable 31.

As the piston 45 is shifted downwardly in the manner set forth above, the oil or its equivalent in the chamber 51 below said piston will be forced upwardly through the conduit 49 to the valve chamber 47 above the pilot valve 59. From this point the oil will flow through the longitudinal conduits 59a to that portion of the valve chamber 51 below said valve 59 from whence said oil will pass through a channel 43a extending longitudinally of the control rod 43 in the customary manner, and to the casing of the pump unit 20 with which said channel communicates in the well known way.

It will be understood that, after the pilot valve 59 has been moved downwardly to a definite extent, the downward movement of the piston 45 which follows such adjustment of said valve 59, will result in again placing the lateral branches of the conduits 48 and 49 in registry with the lands of said valve 59, whereupon the flow of oil from the pump 54 to the upper chamber 50 of the servo-motor will be arrested and the downward movement of the piston 45 will cease.

If the transmitter 73 and receiver 72 are actuated in a direction to produce an upward movement of the valve rod 43, the oil or other fluid which enters the annular channel 52 through the pipe 55 will pass through the radial conduit 53 of the piston 45 to the annular space between the reduced central portion of the pilot valve 59 and the wall of the valve chamber 47, as above described. The upward movement of the pilot valve 59, however, has placed the conduit 49 in communication with the source of pressure oil or the like, so that the latter will flow through said conduit 49 to the chamber 51 beneath the piston 45. As a result the piston 45 will be moved upwardly and carry with it the control rod 43, thus causing the tilting box 39 and swash plate 38 to be inclined in a direction opposite to that previously described. The motor section or B-end 21 accordingly will be operated in the reverse direction and correspondingly actuate the shaft 25, gears 30, 29, and winch 26.

During the aforesaid upward movement of the piston 45, the oil or its equivalent in the chamber 50 will pass therefrom through the conduit 48 to the valve chamber 47 below the pilot valve 59. From this point said oil or the like will pass through the previously mentioned channel 43a in the control rod 43 to the casing of the pump unit 20.

The upward movement of the piston 45 will continue until the lateral branches of the conduits 48 and 49 again register with the lands of the pilot valve 59, whereupon the upward movement of the piston 45 will be arrested. The return of said lateral branches of said conduits 48 and 49 into registry with the aforesaid lands of the pilot valve 59, at which point communication between the source of oil or other pressure and the respective chambers 50 and 51 is cut off, occurs as soon as the piston 45 has moved a distance equal to the movement that has been imparted to the pilot valve 59; this is true regardless of the direction of adjustment of said valve 59. From this it follows that the extent and direction of movement of the pilot valve 59 will at all times predetermine the degree and direction of adjustment of the tilting box 39 and swash plate 38.

During the above operations the locking member 91 occupies an inoperative position in which it is held by the engagement of the pin 97 with the lugs 98, this engagement having been accomplished by first withdrawing the member 91 from the recess 93 and then rotating it about its axis after the pin 97 has passed beyond said lugs 98.

When it is desired to stop the winch 26 and the hydraulic transmission, the hand wheel 73 is rotated to a position in which its recess 93 is in registry with the locking member 91, which is then released and permitted to snap into said recess 93 under the influence of the spring 94. This movement of the hand wheel 73 causes corresponding movements of the rotor 76 of the Selsyn transmitter 73, and the rotor 89 of the Selsyn motor 72, with the result that the shaft 89a, double clutch 108, and gears 71 and 70 will, through the shaft 67 and gears 66 and 65, so adjust the pilot valve 59 that the tilting box 39 and swash plate 38 will be restored to the neutral position shown in Fig. 4.

It has been found in practice that it is very difficult, with the major control so far described, to bring the tilting box 39 and swash plate 38 to the exact neutral point and maintain it there. Furthermore, even when said tilting box and swash plate are adjustable to the exact neutral point under conditions of no load, it has been found, if the transmission is connected to a point where a constant load is maintained on the motor section or B-end 21, that it is necessary for the tilting box and swash plate of the pump section or A-end to be enough off centre, to compensate for the leakage which though small is present in the machine. The secondary or intermittent follow-up control hereinbefore referred to effects the desired results and makes it certain that the motor section or B-end will be held stationary, at will, regardless of conditions of loading, and without interferring with the accuracy of control through the medium of the hand wheel 74 and its associated elements. The intermittent follow-up control operates automatically as follows:—As the locking member 91 enters the recess 93 and accordingly shifts to the right in Fig. 10, it causes the projection 95 to throw the switch 99 and close the electric circuit 101 to thereby cause the solenoid 102 to be energized. The armature 126 of the latter is thereby actuated and operates the valve stem 125 so as to adjust the four-way valve 124 to a position in which oil from the pump 54, by way of the branch pipe 128, is forced through the pipe 122 to the left hand end of the operating cylinder 121. The piston of the latter is accordingly moved toward the right in Fig. 2 and correspondingly actuates the piston rod 120 and the lug 119 of the lever 117; the later is thereby swung on its pivot 118 toward the right in Fig. 2 and by means of its pin 116 acting on the collar 115, shifts the collar 115 of the double clutch 108 in the same direction. This disconnects the clutch member $d$ at the left in Fig. 3ª from the shaft 89a, and at the same time expands the clutch member $d$ at the right in Fig. 3ª into engagement with the associated coupling member $e$ and thereby connects said clutch 108 with the shaft 107, so that the gears 71 and 70 are disconnected from the Selsyn system or major control, and coincidentally connected with the intermittent follow-up control. The shaft 67 and its associated elements and the servo-motor 44 are thus brought into operative connection with said intermittent follow-up control. Inasmuch as the shaft 107 is in driving connection with the shaft 103 and through the latter with the motor section or B-end 21, the servo-motor 44 at this stage is in driving connection with said B-end 21. If it is now assumed that the latter is rotating at a slow rate of speed, this rotation will be communicated to the follow-up shaft 103, chain drive 106, shaft 107 and clutch 108, which in turn operate the gears 71, 70, shaft 67 and gears 66, 65, whereby the valve rod 60 and pilot valve 59 are adjusted in a manner to bring the tilting box 39 and swash plate 38 to the exact neutral position. As soon as this condition is reached, the operation of the motor section or B-end 21 will cease and with it the actuation of the follow-up mechanism.

When it is desired to resume control through the Selsyn system or its equivalent, as for instance, when operation of the winch 26 is again required for mooring purposes the locking member 91 is withdrawn from the recess 93 and fixed in its inoperative position to release the hand wheel 74. As the member 91 is thus shifted to the left in Fig. 10, the projection 95 will operate the switch 99 to open the circuit 101 and to thereby de-energize the solenoid 102. As soon as this occurs the spring 127 will restore the solenoid armature 126 to its normal position and correspondingly move the valve stem 125 whereby the four-way valve 124 will be set in a manner to direct the oil or its equivalent from the pump 54 through the pipe 123 to the right hand end of the cylinder 121. The piston in the latter is accordingly moved toward the left in Fig. 2 and carries with it the piston rod 120 whereby the lever 117 is pivotally swung in the same direction and correspondingly shifts the collar 115 of the clutch 108 toward the left. As a result of these operations the clutch members $d$ will be operatively affected in the manner set forth hereinbefore so that the clutch 108 will be disengaged from the shaft 107, and at the same time connected with the shaft 89a. At this stage therefore the intermittent follow-up control is disconnected from the servo-motor 44, and the latter is coincidentally connected with the major control as exemplified by the Selsyn system in the illustrated example. The cycle of operations hereinbefore set forth may now be repeated in any sequence and in accordance with conditions existing at the time.

It will be seen that the intermittent follow-up control provides a means whereby the operations of the major control are supplemented or otherwise co-operated with to definitely and positively secure the neutral setting of the hydraulic transmission which is desired. At the same time, the intermittent follow-up mechanism also comprises an automatic synchronizing device between the Selsyn transmitter located at the control stand and the Selsyn receiver mounted on the hydraulic transmission. In addition, should the Selsyn units get out of step at any time, which though not likely to happap may occur, the automatic follow-up mechanism will serve to operate the servo-motor without the necessity for any further adjustments.

It is to be understood that the motor section or B-end 21, may be located at a distance from the A-end 20. It is further to be understood that other types of operating means may be substituted for the solenoid 102 and its associated elements for actuating the double clutch whereby the connection between the servo-motor and the control means is effected. Obviously, the servo-motor may itself be replaced by other forms of actuating means for setting the tilting box and swash plate or equivalent elements of the transmission.

Various changes in the specific forms shown and described may be made within the scope of the claims without departing from the spirit of the invention.

I claim:—

1. The combination of a hydraulic variable speed transmission, adjusting means for varying the speed of said transmission, a synchronous electrical transmitting system constituting a major control means for controlling the operation of said adjusting means, a follow-up control means for controlling the operation of said adjusting means, mechanism whereby said major control means and said follow-up control means are connected with and disconnected from said adjusting means in inverse relation, and electrically operated means for controlling the operation of said mechanism.

2. The combination of a hydraulic variable speed transmission, adjusting means for varying the speed of said transmission, a synchronous electrical transmitting system constituting a major control means for controlling the operation of said adjusting means, a follow-up control means for controlling the operation of said adjusting means, a clutch device whereby said major control means and said follow-up control means are connected with and disconnected from said adjusting means in inverse relation, and electrically controlled means for effecting the operation of said clutch device.

3. The combination of a hydraulic variable speed transmission, adjusting means for varying the speed of said transmission, a synchronous electrical transmitting system constituting a major control means for controlling the operation of said adjusting means, a follow-up control means for controlling the operation of said adjusting means, mechanism whereby said major control means and said follow-up control means are connected with and disconnected from said adjusting means in inverse relation, electrically operated means for controlling the operation of said mechanism, a switch controlling said electrically operated means, and a locking device for locking said synchronous electrical transmitting system against operation and for operating said switch.

4. The combination of a hydraulic variable speed transmission, adjusting means for varying the speed of said transmission, a synchronous electrical transmitting system constituting a major control means for controlling the operation of said adjusting means, a follow-up control means for controlling the operation of said adjusting means, a clutch device whereby said major control means and said follow-up control means are connected with and disconnected from said adjusting means in inverse relation, shifting means for operating said clutch device, a solenoid controlling the operation of said shifting means, an electric circuit including said solenoid, a switch whereby said circuit is opened and closed, and a locking device for locking said synchronous electrical transmitting system against operation and for operating said switch.

5. The combination of a variable speed transmission, adjusting means for varying the speed of said transmission, major control means for controlling the operation of said adjusting means, a follow-up control means for controlling the operation of said adjusting means, a clutch device whereby said two control means are connected with and disconnected from said adjusting means in inverse relation, shifting means for operating said clutch device, electrically operated means for controlling the operation of said shifting means, a switch whereby said electrically operated means is controlled, and locking means for locking said major control means against operation and for operating said switch.

6. The combination of a hydraulic variable speed transmission including an adjustable swash plate, a servo-motor for adjusting said swash plate to vary the speed and direction of said transmission, a major control means for controlling the operation of said servo-motor, an intermittent follow-up control for controlling the operation of said servo-motor, clutch means whereby said major control means and follow-up control are connected with and disconnected from said servo-motor, pressure operated means for actuating said clutch means, and means whereby the operation of said pressure operated means is controlled.

7. The combination of a hydraulic variable speed transmission including an adjustable swash plate, a servo-motor for adjusting said swash plate to vary the speed and direction of said transmission, a synchronous electrical transmitting system for controlling the operation of said servo-motor, an intermittent follow-up control for controlling the operation of said servo-motor, clutch means whereby said synchronous electrical transmitting system and said follow-up control are connected with and disconnected from said servo-motor in inverse relation, pressure operated means for actuating said clutch means, a control valve for controlling the admission of a pressure medium to said pressure operated means, and means associated with said synchronous electric transmitting system for controlling the operation of said control valve.

8. The combination of a hydraulic variable speed transmission including an adjustable swash plate, a servo-motor for adjusting said swash plate to vary the speed and direction of said transmission, a synchronous electrical transmitting system for controlling the operation of said servo-motor, an intermittent follow-up control for controlling the operation of said servo-motor, clutch means whereby said synchronous electrical transmitting system and said follow-up control are connected with and disconnected from said servo-motor in inverse relation, pressure operated means for actuating said clutch means, a cortrol valve for controlling the admission of a pressure medium to said pressure operated means, a solenoid for operating said valve, an electric circuit including said solenoid, a switch controlling said electric circuit, and means associated with said synchronous electric transmitting system for operating said switch.

9. The combination of a hydraulic variable speed transmission including an adjustable swash plate, a servo-motor for adjusting said swash plate to vary the speed and direction of said transmission, a synchronous electrical transmitting system for controlling the operation of said servo-motor, an intermittent follow-up control for controlling the operation of said servo-motor, clutch means whereby said synchronous electrical transmitting system and said follow-up control are connected with and disconnected from said servo-motor in inverse relation, pressure operated means for actuating said clutch means, a control valve for controlling the admission of a pressure medium to said pressure operated means, a solenoid for operating said valve, an electric circuit including said solenoid, a switch controlling said electric circuit, and locking device for locking said synchronous electric transmitting system against operation and for operating said switch.

10. The combination of a hydraulic variable speed transmission including an adjustable swash plate, a servo-motor for adjusting said swash plate to vary the speed and direction of said transmission, a synchronous electrical transmitting system for controlling the operation of said servo-motor, an intermittent follow-up control operatively connected with said transmission for operating said servo-motor, clutch means whereby said synchronous electric transmitting system and said follow-up control are connected with and disconnected from said servo-motor, pressure operated means for actuating said clutch means, a control valve for controlling the admission of a pressure medium to said pressure operated means, and means for controlling the operation of said control valve.

11. The combination of a hydraulic variable speed transmission including an adjustable swash plate, a servo-motor for adjusting said swash plate to vary the speed and direction of said transmission, a synchronous electrical transmitting system, an operating shaft operated by said synchronous electric transmitting system, a second operating shaft in opposed axial alinement with said first operating shaft, a counter-shaft in driving connection with said second operating shaft, a driving connection between said counter-shaft and said transmission, a double clutch mounted on said aligning operating shafts in continuous driving engagement with said servo-motor and arranged to be engaged with and disengaged from said operating shafts in inverse relation, and means for operating said double clutch.

12. The combination of a hydraulic variable speed transmission including an adjustable swash plate, a servo-motor for adjusting said swash plate to vary the speed and direction of said transmission, a synchronous electrical transmitting system, an operating shaft operated by said synchronous electric transmitting system, a second operating shaft in opposed axial alignment with said first operating shaft, a counter-shaft in driving connection with said second operating shaft, a driving connection between said counter-shaft and said transmission, a double clutch mounted on said aligning operating shafts in continuous driving engagement with said servo-motor and arranged to be engaged with and disengaged from said operating shafts in inverse relation, pressure operated means for operating said clutch, and means for controlling the operation of said pressure operated means.

13. The combination of a hydraulic variable speed transmission including an adjustable swash plate, a servo-motor for adjusting said swash plate to vary the speed and direction of said transmission, a synchronous electrical transmitting system, an operating shaft operated by said synchronous electric transmitting system, a second operating shaft in opposed axial alignment with said first operating shaft, a counter-shaft in driving connection with said second operating shaft, a driving connection between said counter shaft and said transmission, a double clutch mounted on said aligning operating shafts in continuous driving engagement with said servo-motor and arranged to be engaged with and disengaged from said operating shafts in inverse relation, pressure operated means for operating said clutch, a control valve for controlling the admission of a pressure medium to said pressure operated means, electrically operated means for controlling the operation of said valve, and locking means for locking said synchronous electric transmitting system against operation and for controlling said electrically operated means.

14. The combination of a hydraulic variable speed transmission including an adjustable swash plate, a servo-motor for adjusting said swash plate to vary the speed and direction of said transmission, a synchronous electrical transmitting system, an operating shaft operated by said synchronous electric transmitting system, a second operating shaft in opposed axial alinement with said first operating shaft, a countershaft in driving connection with said second operating shaft, a driving connection between said counter-shaft and said transmission, a double clutch mounted on said aligning operating shafts in continuous driving engagement with said servo-motor and arranged to be engaged with and disengaged from said operating shafts in inverse relation, pressure operated means for operating said clutch, a control valve for controlling the admission of a pressure medium to said pressure operated means, a solenoid for controlling the operation of said valve, an electric circuit including said solenoid, a switch controlling said electric circuit, and locking means for locking said synchronous electric transmitting system against operation and for operating said switch.

In testimony whereof I have hereunto set my hand.

HENRY G. GROS.